United States Patent
Johnson

(10) Patent No.: US 6,555,175 B2
(45) Date of Patent: Apr. 29, 2003

(54) PROCESS FOR THE SURFACE MODIFICATION OF A POLYMERIC SUBSTRATE

(75) Inventor: Joseph Edward Johnson, Lexington, KY (US)

(73) Assignee: Joseph E. Johnson, Lexington, KY (US)

( * ) Notice: Subject to any disclaimer, the term of this patent is extended or adjusted under 35 U.S.C. 154(b) by 0 days.

(21) Appl. No.: 10/078,585

(22) Filed: Feb. 20, 2002

(65) Prior Publication Data

US 2002/0197467 A1 Dec. 26, 2002

Related U.S. Application Data

(60) Provisional application No. 60/269,696, filed on Feb. 20, 2001.

(51) Int. Cl.$^7$ .................................................. B05D 1/00
(52) U.S. Cl. ..................... 427/399; 427/393.5; 427/399
(58) Field of Search ............................... 427/384, 393.5, 427/399

(56) References Cited

U.S. PATENT DOCUMENTS

| | | | | |
|---|---|---|---|---|
| 5,075,427 A | * | 12/1991 | Kang et al. ................. | 534/559 |
| 5,554,739 A | * | 9/1996 | Belmont ..................... | 534/885 |
| 5,571,311 A | * | 11/1996 | Belmont et al. ......... | 106/31.28 |
| 5,630,868 A | * | 5/1997 | Belmont et al. ......... | 106/31.75 |
| 5,922,118 A | * | 7/1999 | Johnson et al. ............ | 106/31.6 |

FOREIGN PATENT DOCUMENTS

| WO | WO 99/31175 | * | 6/1999 |
|---|---|---|---|
| WO | WO 99/51690 | * | 10/1999 |

* cited by examiner

*Primary Examiner*—Erma Cameron

(57) ABSTRACT

A process for modifying the surface of a polymeric substrate is disclosed, wherein said process is comprised of contacting a surface of a polymeric substrate with a protic liquid or fluid containing a diazonium composition under such conditions that will effectively allow the reaction of the diazonium composition with the surface, resulting in the attachment of aromatic groups to the polymeric surface. The polymeric substrate contains aliphatic carbon-hydrogen bonds, while the protic composition is comprised of a diazonium complex formed by diazotizing an amino compound comprised of at least one amino group bonded to an aromatic group. Also disclosed are the products generated using the aforementioned surface modifications.

26 Claims, No Drawings

PROCESS FOR THE SURFACE MODIFICATION OF A POLYMERIC SUBSTRATE

This application is in continuation of Provisional Patent 60/269,696 filed Feb. 20, 2001.

BACKGROUND OF THE INVENTION

1. Field of the Invention

The present invention relates to a process for treating polymeric materials and, more particularly, to a process for modifying the surface of a polymeric substrate using a solution of an aromatic diazonium salt.

2. Discussion of the Related Art

The many surface-modified polymers that have been reported in the literature reflect the continuing need to provide materials having a unique combination of properties. A surface modified polymer may retain inherent, bulk properties of the polymer, such as tensile strength, elongation, chemical stability, optical properties, impact strength, dielectric, conductive, thermal, and acoustic attributes, inertness to specific environments, porosity and the like, while obtaining different surface properties, such as wettability, adhesion, solvent interaction, herbicidal or pharmaceutical activity, chemical reactivity, rheology, and reactive groups. In many instances, the modification of polymers which exhibit enhanced properties at their surface is cumbersome, diminishes bulk polymer properties, or requires costly synthesis.

Numerous types of polymer surface modifications and methods for preparing such modifications are known. Such existing surface modification methods on polymers include gas plasma, radiation grafting, photoinduced grafting, sol-gel process, surface etching, and adsorption. Although these existing surface modification techniques may be adequate for their purposes, they each have their drawbacks. For instance, the gas plasma technique tends to yield non-uniform surface modification. Ionizing radiation may weaken and discolor the polymer material, which is a significant drawback, since the bulk polymer properties are diminished due to an uncontrollable chemical reaction. In photoinduced grafting, a coupling agent reacts directly with the polymer substrate surface, and is sensitive to the particular reactive groups located on the surface of the polymer substrate and the energy level, duration, and distribution of illumination on the surface of the polymer. The sol-gel process creates a modified surface that lacks long-term stability, due to adhesion constraints. Surface etching cleaves the polymer backbone, which weakens the surface structure of the polymer.

Other methods of modifying surfaces of preformed polymer articles are well known and include dissolution and resolubilization, surface degradation, swelling with solvents as well as the reactions between polymers and inorganic groups, e.g., sulftric, nitric, and hydrochloric acids. Each of these means of modifying the surface of a polymer article is cumbersome in controlling the surface reaction without destroying polymer, or is limited to a very small range of polymer substrates and modifying reactants.

Bulk interpenetrating polymer networking is a combination of two polymers in the network form, at least one of which is polymerized in the presence of, and throughout, the other. European Pat. No. 643,083 and U.S. Pat. No. 5,426,158 disclose examples of bulk interpenetrating polymer networks. Drawbacks of interpenetrating polymer networks include a random distribution of polymers, and changes in the bulk properties of the initial polymers. For example, a clear polymer may be modified by the incorporating a transparent polymer, causing the resultant polymer to become hazy.

Methods of reacting aromatic groups with diazo compounds are well known and are the foundation of many azo dye and lithographic applications. However, these technologies involve the coupling of an aromatic group with a diazo compound through an azo complex containing the N=N bond, and typically forming a colored complex. The coupling of aromatic groups, without an azo bridging complex, may be obtained using the Gomberg-Bachmann reaction. The reaction has been performed on several types of aromatic rings and quinones. However, conditions for the reaction require the initial formation of a diazonium salt in an acid solution followed by a reaction in alkali media. Olefins may also be arylated by treatment with a diazonium salt in the presence of a cupric chloride catalyst. However, conditions require an abundance of chloride ions in addition to the cupric chloride catalyst. Additionally, an intramolecular reaction can occur in aromatic compounds by the alkaline solution or the copper-ion procedure resulting in a ring closure, termed the Pschorr reaction. All of these common methods of reacting aromatic groups and diazo compounds involve specific reaction conditions, but are limited to non-polymers.

A variety of techniques for the chemical modification of surfaces, including those of polymeric materials, are known in the art. U.S. Pat. No. 3,376,278, for example, the disclosure of which is incorporated herein by reference, describes a process for chemically modifying a polymer surface by contacting it with a compound containing a diazo radical attached to a nonaromatic carbon atom. Exposure of the surface to actinic radiation causes decomposition of the diazo compound to a divalent carbon species that reacts with the surface.

U.S. Pat. No. 5,075,427, the disclosure of which is incorporated by reference, describes storage stable diazo compositions that consist essentially of an aqueous solution of a compound in which the diazo group is attached to an aliphatic carbon that is also substituted with an electron-withdrawing group.

U.S. Pat. No. 5,277,772, the disclosure of which is incorporated herein by reference, relates to the chemical modification of various surfaces, including glass, aluminum, and organic polymers, by photoactivation of a heterocyclic azido compound in the presence of the surface and in the substantial absence of air and water.

U.S. Pat. No. 4,309,453, the disclosure of which is incorporated herein by reference, describes a process for surface modification of natural or synthetic macromolecular substrates in which a solution of a diazo or an azido compound in an organic solvent is applied as a thin layer on the substrate surface, which is irradiated to produce, respectively, a carbene or a nitrene that reacts with the surface.

U.S. Pat. No. 5,922,118, the disclosure of which is incorporated herein by reference, describes ink jet compositions containing colored pigments such as carbon black that have been modified by treatment with a solution of an aryl or an alkyl diazonium salt.

Despite the technology discussed above, there remains a need to modify the surface chemistry of polymers and impart desired properties while retaining other inherent properties. The numerous methods of continued surface modification of polymers reflect the need for improved properties. In many cases, the modification of polymers is cumbersome or impractical, diminishes polymer properties, requires costly synthesis, or does not achieve the expected results.

It will be appreciated from the foregoing that there is a definite need for a process whereby the surface of a polymer can be modified to have certain desired surface properties, while at the same time maintaining the desirable bulk physical properties of the polymer. Desired surface properties resulting from the surface modification of the polymer include the ability to control wettability, adhesion, solvent interactions, herbicidal or pharmaceutical activity, dielectric, thermal, and acoustic activity, chemical reactivity, rheology, and porosity. These properties may be controlled by varying the amount and type of hydrophilic and hydrophobic groups on the surface of the polymer. Chemical reactivity is defined as the ability of surface groups of the modified polymer to interact with chemicals, including further chemical reactions. Chemical compatibility is the ability of the surface groups of the modified polymer to enhance the interactions with liquids, gases, solids, and mixtures of these. Further, the surface modification process should be controlled so as to yield a defined type, amount and distribution of modifying groups on the polymer. Also, the process should not weaken or discolor the polymer material, should be relatively simple and inexpensive, and should provide a surface modification that has long-term stability. The present invention meets these needs.

SUMMARY OF THE INVENTION

A process for modifying the surface of a polymeric substrate with an aromatic group containing at least one primary amine, whereas in the said process, the polymeric substrate contains aliphatic carbon-hydrogen bonds that react with an aromatic group in a protic composition comprising a diazonium salt formed by diazotizing an amino compound comprising at least one amino group bonded to an aromatic group, and contacting the surface of said polymeric substrate with said diazonium salt composition under conditions in a protic liquid or fluid effective to allow reaction of said composition with said surface, resulting in attachment of said aromatic group to said surface. Also disclosed is the use of polymeric substrates modified by the aforementioned process.

DETAILED DISCRIPTION OF THE INVENTION

The process comprises of a diazonium complex reacting with a polymer containing aliphatic groups under conditions to produce a diazonium complex and attach the remainder of the aromatic group. The aromatic group that may attach to a suitable polymer may be part of an oligomer or polymer with at least one hydrophilic or hydrophobic group. Polymer products which may be prepared according to the process of the invention are described herein. Uses of such polymer products include, but are not limited to, chromatography supports, containers, drug and chemical delivery systems, fiber optics, films, filters and membranes, inkjet and liquid delivery print heads, inkjet, papers and transparencies, medical and biological diagnostics, medical and dental implants and devices, microarrays, microassay plates and wells, microelectronics and microchips, microwave agents, oil and fuel additives, packaging materials, paints and inks, paper fillers and coatings, particles, pigments, Theological, liquids and fluids, thickening agents, and toners.

A wide range of conventional polymers can be used in the present invention provided that such polymers contain at least one aromatic ring. Suitable classes of polymers include, but are not limited to, epoxy (EP), parylene, poly (acrylonitrile-butadiene-styrene) copolymer (ABS), polybenzimidazole (PBI), polybutyleneterephtalate (PBT), polycarbonate (PC), polyethyleneterephtalate (PETE), poly (melamine-formaldehyde) (MF), poly(phenol-formaldehyde) (PF), poly(phenylene oxide) (PPO), poly (phenylene sulfide) (PPS), polystyrene (PS), polysulphone (PSU), polyurethane (PUR), poly-p-xylylene (PPX), and unsaturated polyester rubber and alkyd. Suitable polymers are oligomers or polymers containing at least one aromatic group.

The polymer may also be a copolymer or mixture of a multiple polymers of suitable classes. The polymer may also be copolymer or mixture of one or more suitable polymer classes and non-suitable polymers.

The aromatic organic group that may be attached to a suitable polymer substrate having at least one aromatic group with at least, and preferably, one primary amine. A suitable organic group may be represented as $(Y)_x$—$(Ar)_z$—$(NH_2)_w$, wherein Y represents H or one or more substituents, Ar is an aromatic group, and $NH_2$ is a primary amine, and with x being an integer of 1 or greater, z being an integer of 1 or greater, and w being an integer of 1 or greater. A substituent is a hydrophobic, hydrophilic, ionic, ionizable, aliphatic, polymeric, oligomeric, electrophilic-including halide, or nucleophilic groups, or combinations thereof. The organic group that may be attached to a suitable polymer may contain at least one hydrophilic or hydrophobic group.

The organic group that is hydrophilic has at least one ionic or ionizable functional group. An ionizable group is one which is capable of forming an ionic group in the medium of use. The ionic group may be an anionic group or a cationic group and the ionizable group may form an anion or a cation. Ionizable functional groups forming anions include, for example, acidic groups or salts of acidic groups. The organic groups, therefore, can include groups derived from organic acids. Preferably, when the organic group contains an ionizable group forming an anion, the organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. The naphthyl group may be mono-substituted with an acidic group on either ring. The naphthyl group may also be substituted with two or more acidic groups, with the acidic groups on the same or different rings. Examples of ionic or ionizable groups include —COOH, —$SO_3$H and —$PO_3H_2$, —$SO_2$NHCOR, and their salts, for example —COONa, —COOK, —COO$^-$NR$_4^+$, —$SO_3$ Na, —HPO$_3$ Na, —$SO_3^-$—NR$_4^+$, and PO$_3$Na$_2$, where R is a saturated or unsaturated alkyl or phenyl group. Particularly preferred ionizable substituents are —COOH and —$SO_3$H and their ammonium, sodium, lithium and potassium salts.

Accordingly, it may be preferred that a suitable polymer may be treated with aryl diazonium salts containing at least one acidic functional group. Examples of aryl diazonium salts include, but are not limited to, those prepared from sulfanilic acid, 4-aminobenzoic acid, 4-amino salicylic acid, 7-amino4-hydroxy- 2-naphthalenesulfonic acid, aminophenylboronic acid, aminophenylphosphonic acid, 4-aminophthalic acid, 2-amino-1-naphthalenesulfonic acid, 5-amino-2-naphthalenesulfonic acid, 3-amino-6-chlorobenzoic acid, and metanilic acid.

The organic group can be a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. One example of a sulfophenyl group is hydroxysulfophenyl group or a salt thereof.

Specific organic groups having an ionizable functional group forming an anion are p-sulfophenyl and 4-hydroxy-3-sulfophenyl.

Amines represent examples of ionizable functional groups that form cationic groups and can be attached to the same organic groups as discussed above for the ionizable groups that form anions. For example, amines may be protonated to form ammonium groups in acidic media. Preferably, an organic group having an amine substituent has a pKb of less than 5. Quaternary ammonium groups ($-NR_3^+$) and quaternary phosphonium groups ($-PR_3^+$) also represent examples of cationic groups and can be attached to the same organic groups as discussed above for the ionizable groups which form anions. Preferably, the organic group contains an aromatic group such as a phenyl or a naphthyl group and a quaternary ammonium or a quaternary phosphonium group. Quaternized cyclic amines, and quaternized aromatic amines, can also be used as the organic group. Thus, N-substituted pyridinium compounds, such as N-methyl-pyridyl, can be used in this regard. Examples of organic groups include, but are not limited to, $3\text{-}C_5H_4\ N(C_2H_5)^+\ X^-$, $C_6H_4NC_5H_5^+\ X^-$, $C_6H_4\ COCH_2N(CH)_3{}_3{}^+\ X^-$, $C_6H_4\ COCH_2(NC_5H_5)^+\ X^-$, $3\text{-}C_5H_4\ N(CH_3)^+\ X^-$, $C_6H_4\ N(CH_3)_3{}^+\ X^-$, and $C_6H_4\ CH_2N(CH_3)_3{}^+\ X^-$, wherein $X^-$ is a halide or an anion derived from a mineral or organic acid. Other examples include $pC_6H_4\ -SO_3{}^-\ Na^+$, $pC_6H_4\ -CO_2{}^-\ Na^+$, and $C_5H_4N^+\ C_6H_5\ (NO_3)^-$.

Additional optional functional groups which may be present on the organic group include, but are not limited to, R, OR, COR, COOR, OCOR, halogen, CN, $NR_2$, $SO_2\ NR(COR)$, $SO_2\ NR_2$, $NR(COR)$, $CONR_2$, $NO_2$, $SO_3\ M$, $SO_3\ NR_4$, and $N=NR'$. R is independently hydrogen, $C_1$-$C_{20}$ substituted or unsubstituted alkyl (branched or unbranched), $C_3$-$C_{20}$ substituted or unsubstituted alkenyl, $(C_2\text{-}C_4\text{ alkyleneoxy})_x\ R''$, or a substituted or unsubstituted aryl. R' is independently hydrogen, $C_1$-$C_{20}$ substituted or unsubstituted alkyl (branched or unbranched), or a substituted or unsubstituted aryl. R" is hydrogen, a $C_1$-$C_{20}$ to substituted or unsubstituted alkyl, a $C_3$-$C_{20}$ substituted or unsubstituted alkenyl, a $C_1$-$C_{20}$ substituted or unsubstituted alkanoyl, or a substituted or unsubstituted aroyl. M is H, Li, Na, Cs, or K. The integer x ranges from 1–40 and preferably from 2–25.

Another example of an organic group is an aromatic group of the formula $A_y\ Ar$, which corresponds to a primary amine of the formula $A_y\ ArNH_2$. In this formula, the variables have the following meanings: Ar is an aromatic radical selected from phenyl, naphthyl, anthracenyl, phenanthrenyl, biphenyl, pyridinyl, and triazinyl; A is a substituent on the aromatic radical independently selected from a functional group described above or A is a linear, branched or cyclic hydrocarbon radical (preferably containing 1 to 20 carbons), unsubstituted or substituted with one or more of those functional groups; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl. When A is a $(C_2\text{-}C_4\text{ alkyleneoxy})_x\ R''$ group, it is preferably a polyethoxylate group, a polypropoxylate group, or a random or block mixture of the two.

Another example of a modified polymer comprises a suitable polymer and an attached organic group having a) an aromatic group or a $C_1$-$C_{12}$ alkyl group and b) at least one group of the formula $SO_2\ NR_2$ or $SO_2\ NR(COR)$. R is independently hydrogen, a $C_1$-$C_{20}$ substituted or unsubstituted alkyl, a $C_3$-$C_{20}$ substituted or unsubstituted alkenyl, $(C_2\text{-}C_4\text{ alkyleneoxy})_x\ R'$ or a substituted or unsubstituted aryl; R' is hydrogen, a $C_1$-$C_{20}$ substituted or unsubstituted alkyl, a $C_3$-$C_{20}$ substituted or unsubstituted alkenyl, a $C_1$-$C_{20}$ substituted or unsubstituted alkanoyl or substituted or unsubstituted aroyl; and x is from 1 to 40. Aromatic groups include $p\text{-}C_6\ H_4\ SO_2\ NH_2$, $p\text{-}C_6\ H_4\ SO_2\ NHC_6\ H_{13}$, $p\text{-}C_6\ H_4\ SO_2\ NHCOCH_3$, $p\text{-}C_6\ H_4\ SO_2\ NHCOC_5\ H_{11}$ and $p\text{-}C_6\ H_4\ SO_2\ NHCOC_6\ H_5$.

An organic group that is hydrophobic has at least one nonionic or nonionizable functional group. A nonionizable or nonionic group is one which is not capable of forming an ionic group in the medium of use.

An organic group may contain one or more hydrophilic and one or more hydrophobic groups, or a combination of hydrophilic and hydrophobic groups.

The organic group that may attach to a suitable polymer may be part of an oligomer or polymer with at least one hydrophilic or hydrophobic group.

In the preferred preparation of the above modified polymer products, the diazonium salt need only be sufficiently stable to allow reaction with the polymer. Thus, that reaction can be carried out with some diazonium salts otherwise considered to be unstable and subject to decomposition. Some decomposition processes may compete with the reaction between the polymer and the diazonium salt, and may reduce the total number of organic groups attached to the polymer. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. The diazonium salts may be prepared in situ. It is preferred that the modified polymer of the present invention contain no by-products or unattached salts.

In the preferred process of preparation, a suitable polymer, can be reacted with a diazonium salt when present as a two or three dimensional entity, including, but not limited to, a film, a sheet, a membrane, a rod, a tube, a membrane, a granule, a powder, a particle, a fiber, a fabric, a container, or a shaped article, and whereas the substrate may be porous or non-porous.

The entity's classification is attributed to the amount of suitable polymer being exposed to the diazonium reaction, and subsequent attachment of an organic group.

For purposes of the present invention, the amount of organic group attached to the polymer is important for purposes of the subsequent use, and further chemical, adsorption, or repulsion reactions, of the modified polymer in such applications as filters, membranes, chromatography supports, microassay plates and wells, microarrays, microchips, test tubes, films, inkjet papers and transparencies, containers, tubes, pigments, and diagnostic particles.

To prepare the surface modified polymers of the present invention, it is desired that the reaction take place in an environment where decomposition of a diazonium complex occurs in the presence of the polymer. The surface modified polymer, to the extent that a decomposed diazonium salt is present, may be prepared preferably by reacting a polymer, with a diazonium salt in a liquid reaction medium to attach at least one organic group to the surface of the polymer. The diazonium salt may contain the organic group to be attached to the polymer. A diazonium salt is an organic compound having one or more diazonium groups. Reaction media include protic solutions. Preferred reaction media include water, any medium containing water, and any medium containing alcohol. Water is the most preferred medium.

Processes of decomposing a diazonium group and reaction media are described in U.S. Pat. No. 5,900,029 and U.S. Pat. No. 5,837,045, the disclosures of which are incorporated herein by reference.

Preferably, the process is carried out in protic medium, such as water, at a pH less than 7, more preferably at a pH of about 1 to 6. In addition, it is preferred that the reaction temperature is between −10 degrees C. and about 100 degree C., preferably around 70 degrees C.

Polymer products which may be prepared according to processes include, but are not limited to, chromatography supports, containers, drug and chemical delivery systems, fiber optics, films, filters and membranes, inkjet and liquid delivery print heads, inkjet, papers and transparencies, medical and biological diagnostics, medical and dental implants and devices, microarrays, microassay plates and wells, microelectronics and microchips, microwave agents, oil and fuel additives, packaging materials, paints and inks, paper fillers and coatings, particles, pigments, rheological, liquids and fluids, thickening agents, and toners.

Chromatographic supports, specifically for high pressure liquid chromatography (HPLC), gel permeation chromatography, and ion exchange applications, typically consist of 2 micrometer to 20 micrometer particles, and low pressure liquid chromatography (LPLC) and ion exchange applications, typically consisting of 16 micrometer to 200 micrometer particles, comprised of polymers or polymer-coated silica particles for the separation of soluble or semi-soluble materials. Some examples of water soluble ionic and nonionic materials include amino acids, organic acids, quaternary amines, organic amines, drugs, drugs in serum, explosives, nucleotides, nucleosides, chelating compounds, proteins, peptides, nucleic acids, sugars, taxol, taxanes, vitamins, oliosaccharides, polymers, oligomers, organic ions, carbohydrates, and sugars. Some examples of organic soluble materials include aflatoxins, steroids, fat-soluble vitamins, fatty acids, polyaromatic hydrocarbons, polymers, triglycerides, vitamins, polymers and oligomers. In these applications, it is necessary that the surface of the polymer have certain beneficial properties in order to be in contact with separating materials including wettability and repulsion, which may be attributed to the hydrophilic/hydrophobic nature of the polymer. Current chromotographic supports are numerous, but are limited to a few polymers, such as sulfonated polystyrene/divinyl benzene, poly(divinylbenzene/methacrylate), and polyvinylalcohol. Additionally, polymer-coated silica particles are used for chromatographic supports, since they combine the mechanical and solvent resistant properties for the bulk particle, with the polymer properties for the surface. In the polymer particle case, there are limited polymers, where the surface groups are similar to those in the bulk and may not be varied. Polymer-coated silica is restricted by the limited types of organic silane groups that may be reacted with the silica particle, and the complex and expensive process to coat the silica particles. The polymer-coated silica demonstrates a need to have beneficial mechanical properties of a base particle combined with beneficial surface groups.

Containers, such as fuel and liquid containers, are composed of a variety of polymers due to solubility, clarity, and cost. Fuel cells and tanks need to be inert to the fuel, i.e., insoluble, and preferably non-binding to ensure proper flow of fuel. Other containers include test and culture tubes, beakers, and storage jars and drums. Non-specific binding of cells and other biological material is often necessary, but lacking due to limitations of the polymer composing the container. A need exists to match the chemicals and liquids being stored with the chemical properties of the polymer surface and bulk physical properties of the polymer.

Drug and chemical delivery systems for biological and agricultural use rely on surface adhesion properties of polymers and other substrates. Other uses include sensitive release of perfumes, e.g.,"scratch and sniff", microcarrier beads and matrices, prevention of oxidation, e.g., flavors and food spoilage, masking of unpleasant flavors, e.g., bitter drugs, controlled release of drugs, nutrients, and pesticides. In each case, there is a need for surface properties, including absorption, adsorption, and desorption, and the physical properties of the polymer to be optimized. Plastic optical fibers are generally composed of polymethylmethacrylate (PMMA) or fluorinated aromatic polymers. Silica fibers may have a sheathing of polyvinyl chloride, polyethylene, polyurethane, or PMMA polymers. Other fiber optic articles include sensors and assemblies. A need for improved light transference, water repellence and surface compatibility and adhesion is required, and will only be accomplished with the development of new polymers.

Polymer films and packaging are composed of a variety of polymers to protect components from heat, light, water or other solvents, and electrical charge. Both the physical, bulk property of the polymer and the surface property of the polymer contribute to the ability to protect the underlying components.

Polymers are often used as filters or porous membranes for the removal or separation of fine particulates, dyes, macromolecules, ions, microorganisms, and biological substances due to the fact that they are easy to process, they have good mechanical properties, and they are resistant to most solvents, such as HPLC solvents, and buffers. Solid phase extraction is another use of polymers. In all of these applications, it is necessary that the surface of the polymer have certain beneficial properties in order to be in contact with filtered materials including wettability and repulsion, which may be attributed to the hydrophilic/hydrophobic nature of the polymer. Current filter and membrane products are comprised of few polymers, such as polyether sulfone, polysulfone, mixed cellulose esters, nylon, and teflon-coated polypropylene, which in turn are limited in their hydrophilic/hydrophobic nature and their mechanical properties. A need exists to modify polymers, before or after forming filter and membrane products, to vary the hydrophilic/hydrophobic nature of their surfaces, while maintaining the inherent mechanical properties of the polymer.

Inkjet inks are composed of colorants, polymers, and solvents. The colorants are usually colored, i.e., adsorb light in the visible wavelength range. However, polymeric materials may be used as for security, since they absorb in the ultraviolet (UV) wavelength range and may be used as a substrate for dyes and other detection media. Additionally, polymeric particles may be used as clear or white colorants. The polymeric materials may be coupled with dyes or pigments to form colored or ruminating (e.g., phosfluorescing or fluorescing) entities. Additionally, polymeric materials comprising a two- or three-dimensional surface may be used to bind and coat colorants providing protection from UV light, water, or liquids.

Inkjet print heads are composed of a variety of materials including a polymeric coating with specific surface energies. The coating prevents the adherence of ink and the uniform delivery of ink drops. A need exists for a polymer to bind to the print head substrate and provide physical properties and surface properties.

Inkjet, laser, and screen printing transparencies and films are often made of polyacetate, polypropylene, or polycarbonate sheets. The transparencies may be coated with silica particles and gelatin coatings to ensure ink capture for character resolution and faster time of drying. Inkjet and laser paper are comprised of cellulostic materials and coatings including clays, titanium dioxide, polymer particles, and polymers to ensure ink capture for character resolution and faster time of drying. However, such coatings may be non-uniformly distributed on the transparency or paper or interact adversely with the ink causing varied image resolution.

Medical and biological diagnostics are based on polymer particles in agglutination, immunoassay, and in vivo detection tests. Fluorescent immunoassays (FIA), enzyme linked immunoassays (ELISA), and sandwich/competitive immunoassays are examples of polymer beads used in medical and diagnostic tests. Porous retaining matrices comprised of polymers are suitable for reagent immobilization due to a large surface area to volume ratio, greater reagent (e.g., cell, protein or nucleotide) binding capacity, and superior continuous passage of a liquid either laterally or in a direction perpendicular to the plane of a membrane or other matrix. Retaining matrices are used for diagnostic and research purposes, including pH test strips, ELISA assays, gel electrophoresis, glucose test strips, and HCG pregnancy dipsticks. Additionally, dye-coated, dye-incorporated, and magnetic material-incorporated polymer particles have been used for diagnostic, detection, and removal purposes in medical, biological, and food diagnostics. Other applications of polymer particles include in vivo diagnostic tests, e.g., magnetic resonance imaging, and removal of biological materials, e.g., ions, macromolecules, and cells. A need exists for improved polymeric particles, since current methods typically have unwanted surfactants for stabilization and an unknown amount of surface groups.

Medical and dental implants and devices incorporate the use of polymers to prevent thrombosis, or the aggregation of cells, fibrinogen, and other in vivo materials. Examples of implants and devices include catheters, angioplasty balloons, artificial joints, pace makers, artificial heart, artificial hips, artificial skin, dentures, dental bridges, contact lenses, ophthalmic substrates, surgery implements and instruments, diagnostic particles, beads, and matrices; and ion or biomaterial-removal polymers. The polymer needs to have physical, bulk, attributes, e.g., conformational structure, as well as surface properties, e.g., binding to ceramics or metals and non-binding with in vivo materials.

Current microassay plate and well products consist of multiwell plates, cultureware, streptavidin-coated multiwell plates, and nickel chelate affinity matrix multiwell plates comprised of polystyrene, collagen-coated polystyrene, streptavidin-coated polystyrene, and nickel chelate coated polystyrene, respectively. Polystyrene is used for the plate and wells due to its transparency, moldability, and non-interference with the light used in the detection devices. These products are used for immunoassays and microarrays including those involving antibodies, antigens, proteins, and nucleotides. Limitations of the current products include low restricted surface groups in the wells and culture well for additional binding reactions and non-specific binding.

The microelectronics industry uses polymers as protective coverings and conductive conduits for capacitors and resistors. A microchip is a unit of packaged computer circuitry manufactured from materials including silicon and polymers at a very small scale. Microchips are made for program logic (logic or microprocessor chips) and for computer memory (memory or random access memory chips). Microchips are also made that include both logic and memory and for special purposes such as analog-to-digital conversion, bit slicing, and gateways. A need exists for polymeric material to have specific conductive, thermal, and adhesive properties.

Polymers, e.g., polycarbonate, can be used as microwave agents, to block or filter microwave energy. These polymers need to be attached to a substrate and are also exposed to the environment. A need exists to modify the surface of polymers used for microwave applications.

Polymers and polymer particles are used as oil and fuel additives, and agglomeration agents for water purification. As an oil or fuel additive, the polymer may adsorb non-fuel products, e.g., soot. As an agglomeration agent, the polymer may adsorb waste material and ions before settling and purifying water. Both the bulk and surface properties are important in these systems.

Polymers are used in paints and inks too impart resultant characteristics, e.g., water resistance, binding, impact resistance, gloss, and other imaging attributes. Polymers are also incorporated in papers, coatings, and toners to impart specific properties, e.g., gloss, strength, brightness, binding, etc. Additionally, polymers are used as thixotropic agents that impart desired Theological, thickening, and viscosity properties. Such properties are controlled by surface characteristics of the polymer.

Polymer particles vary in size from about 10 nanometers to about 1,000 micrometers in diameter, depending upon the application. Polymer particles that are inherently hydrophobic require surfactants or other adsorbed surface materials to render the particles hydrophilic. However, the type and amount of surfactant is highly dependent on the particle surface area, type of particle, and liquid environment. Further, changes in the liquid environment can alter the adsorption of the surfactant, causing adverse and uncontrolled properties. Additionally, hydrophilic polymers are limited in only having similar internal and surface compositions, which depends on the initial polymer synthesis. A need exist to attach non-removable surface groups onto polymer particles, where the surface groups would not be removed by changing the liquid environment.

Additionally, a need exist for the type and amount of attached surface groups to be varied and dissimilar to the internal particle for enhanced interaction with liquids, as well as other surface reactions and additions.

This invention may also be applied in the food industry, the medical and hospital supply fields, diapers and other liners, e.g., chemical and biological, and other areas where hydrophilic, porous, wettable, or wicking articles are desired.

The invention will be further clarified by the following examples, which are intended to be purely exemplary of the invention.

Materials

The following materials were used as examples, and not to be used as limitations, of polymeric substrates that can have their surfaces modified.

Polyethyleneterephthalate, PETE, No. TP9, C129, No.4500392 was made by the Solo Cup Co., Urbana, Ill.

Polystyrene, PS, No. WinCup C12–13, was made by the HANDIKUP Co., Phoenix, Ariz.

Polyimide, PI, thirty-gauge (7.5 $\mu$m) Kapton® HN film was made by DuPont High Performance Films, Circleville, Ohio.

Polycarbonate, PC, was obtained from Jutras Sign Co., Manchester, N.H., in the form of five-mil HYZOD® film.

Polycarbonate membrane filters, Nucleopore, 13 mm, with a pore diameter of 1.2 $\mu$m, No. PC MB 110410 filters, were from COSTAR.

Equipment

The following equipment was used to demonstrate the examples.

Syringes, 10 ml and 60 ml Luer-Lok™ type were from Becton-Dickinson, Franklin Lakes, N.J.

Filtration cartridge assembly, SWINNEX, Cat. No. SX0001300, was from Millipore Corp., Bedford, Mass.

Chemicals

All chemicals used for the examples were reagent grade or higher in purity (Spectrum Laboratory Products and Sigma Aldrich Chemical Co.). The water used in all examples was distilled.

Procedures

Contact Angle: The contact angle data was obtained using a Rame-Hart Model 100-type goniometer, using the sessile drop method. Distilled water and diiodomethane (methylene iodide) were the liquids used to determine contact angle.

Surface Energy: Surface energies were calculated using the Young-Dupree equation. An average of six contact angles readings was used in the calculations.

Sulfur Analysis: Chemical analysis of sulfur was determined by ion coupled plasma-optical emission spectra (ICP-OES) analysis, performed by Galbraith Laboratories, Knoxville, Tenn.

Chlorine Analysis: Chemical analysis of chlorine was by ion chromatography (IC) analysis, after sample pyrolysis, all performed by Galbraith Laboratories, Knoxville, Tenn.

EXAMPLES

The following examples are intended to illustrate, not limit, the claimed invention.

Example 1

Preparation of a Polymeric Product Using Polyethyleneterephthalate

A solution of 5.2 g of sulfanilic acid in 75 ml of water at about 70 degrees C. and a solution of 2.3 g of NaNO2 in 75 ml at about 70 degrees C. were poured in a 250 ml PYREX® beaker containing a 2-inch disk of PETE. Rapid bubbling occurred at the surface of the PETE disk. Within five minutes the color of the mixture changed from clear with white solids (clear-white) to a dark brown solution. The pH of the mixture was 4.73. The reaction was allowed to continue for eight hours, and the resulting pH was 5.66. Bubbling was still visible at the surface of the disk. The PETE disk was removed from the mixture and washed repeatedly with water. The PETE disk product was still transparent and has attached p-C6H4SO3-groups.

Example 2

Preparation of Polymeric Products Using Polyethyleneterephthalate

Polymeric products were prepared in the same manner as Example 1, except the amounts of sulfanilic acid and NaNO2 were varied as listed in Table 1. The color changes and pH values of the mixtures, and bubbling at the PETE surfaces are also noted in the table. The examples having a mixture of sulfanilic acid and NaNO2 changed in color, increased in solution pH, and had bubble formation at the surface of the PETE disks. The PETE disk products treated with a mixture of sulfanilic acid and NaNO2 were still transparent and have attached p-C6H4SO3-groups.

TABLE 1

Amount of Reactants and Observations for Sulfanilic acid-PETE Products

| Example | Added Sulfanilic Acid (g) | Added NaNO2 (g) | Color (initial) | Color (5 min) | Color (8 hr) | pH (initial) | pH (8 h) | Bubbling at Disk Surface |
|---|---|---|---|---|---|---|---|---|
| 1 | 5.2 | 2.3 | clear-white | dark brown | dark brown | 4.73 | 5.66 | Yes |
| 2a | 0.52 | 0.24 | clear-white | light yellow | gold | 4.47 | 5.49 | Yes |
| 2b | 0.052 | 0.023 | clear-white | light yellow | yellow | 4.35 | 4.99 | Yes |
| 2c | 0.52 | 0 | clear-white | clear-white | clear-white | 2.23 | 2.25 | No |
| 2d | 0 | 0.23 | clear | clear | clear | 6.70 | 6.71 | No |
| 2e | 0 | 0 | clear | clear | clear | 6.50 | 5.82 | No |

Example 3

Preparation of Polymeric Products Using Polystyrene

Polymeric products were prepared in the same manner as Example 1, except that a 2-inch disk of PS was used as the substrate. The amounts of sulfanilic acid and NaNO2 were varied as listed in Table 2. The color changes and pH values of the mixtures, and bubbling at the PETE surfaces are also noted in the table. The examples having a mixture of sulfanilic acid and NaNO2 changed in color, increased in solution pH, and had bubble formation at the surface of the PS disks. The PS disk products treated with a mixture of sulfanilic acid and NaNO2 were still white and have attached p-C6H4SO3-groups.

Example 5

Preparation of a Polymeric Products Using Polycarbonate

Polymeric products were prepared in the same manner as Example 1, except that a 1 sq. inch film of PC was used as the substrate. The amounts of sulfanilic acid and NaNO2 were varied as listed in Table 4. The color changes of the mixtures, and bubbling at the PC surfaces are also noted in the table. The examples having a mixture of sulfanilic acid and NaNO2 changed in color and had bubble formation at the surface of the PC disk. The PC disk products treated with a mixture of sulfanilic acid and NaNO2 were transparent and have attached p-C6H4SO3-groups.

TABLE 2

Amount of Reactants and Observations for Sulfanilic Acid-PS Products

| Example | Added Sulfanilic Acid (g) | Added NaNO2 (g) | Color (initial) | Color (5 min) | Color (8 hr) | pH (initial) | pH (8 h) | Bubbling at Disk Surface |
|---|---|---|---|---|---|---|---|---|
| 3a | 5.2 | 2.3 | clear-white | dark brown | dark brown | 4.75 | 5.72 | Yes |
| 3b | 0.52 | 0.24 | clear-white | light yellow | gold | 4.5 | 5.55 | Yes |
| 3c | 0.052 | 0.023 | clear-white | light yellow | yellow | 4.37 | 5.03 | Yes |
| 3d | 0.52 | 0 | clear-white | clear-white | clear-white | 2.25 | 2.22 | No |
| 3e | 0 | 0.23 | clear | clear | clear | 6.66 | 6.68 | No |
| 3f | 0 | 0 | clear | clear | clear | 6.55 | 5.85 | No |

Example 4

Preparation of Polymeric Products Using Polyimide

Polymeric products were prepared in the same manner as Example 1, except that a 4 sq. inch film of PI was used as the substrate. The amounts of sulfanilic acid and NaNO2 were varied as listed in Table 3. The color changes of the mixtures, and bubbling at the PETE surfaces are also noted in the table. The examples having a mixture of sulfanilic acid and NaNO2 changed in color and had bubble formation at the surface of the PI films. The PI film products treated with a mixture of sulfanilic acid and NaNO2 were still transparent gold and have attached p-C6H4SO3-groups.

TABLE 3

Amount of Reactants and Observations for Sulfanilic acid-PI Products

| Example | Added Sulfanilic Acid (g) | Added NaNO2 (g) | Color (initial) | Color (5 min) | Color (8 hr) | Bubbling at Disk Surface |
|---|---|---|---|---|---|---|
| 4a | 5.2 | 2.3 | clear-white | dark brown | dark brown | Yes |
| 4b | 0.52 | 0.24 | clear-white | yellow | gold | Yes |
| 4c | 0.052 | 0.023 | clear-white | yellow | dark yellow | Yes |
| 4c | 0 | 0 | clear | clear | clear | No |

TABLE 4

Amount of Reactants and Observations for Sulfanilic acid-PC Products

| Example | Added Surfanilic Acid (g) | Added NaNO2 (g) | Color (initial) | Color (5 min) | Color (8 hr) | Bubbling at Disk Surface |
|---|---|---|---|---|---|---|
| 5a | 5.2 | 2.3 | clear-white | dark brown | dark brown | Yes |
| 5b | 0 | 0 | clear-white | clear | clear | No |

Example 6

Preparation of a Polymeric Product Using Polyethyleneterephthalate

A solution of 4.2 g of p-amino benzoic acid in 75 ml of water at about 70 degrees C. and a solution of 2.3 g of NaNO2 in 75 ml at about 70 degrees C. were poured in a 250 ml PYREX® beaker containing a 2-inch disk of PETE. Rapid bubbling occurred at the surface of the PETE disk. Within five minutes the color of the mixture changed from clear with white solids (clear-white) to yellow with white solids (yellow-white), and after 8 hours the mixture was brown with white solids (brown-white). The initial pH of the mixture was 4.85. The reaction was allowed to continue for eight hours, and the resulting pH was 6.12. Bubbling was still visible at the surface of the disk. The PETE disk was removed from the mixture and washed repeatedly with water. The PETE disk product was still transparent and has attached p-$C_6H_4CO_2$-groups.

Example 7

Preparation of Polymeric Products Using Polyethyleneterephthalate

Polymeric products were prepared in the same manner as Example 6, except the amounts of p-amino benzoic acid and NaNO2 were varied as listed in Table 5. The color changes and pH values of the mixtures, and bubbling at the PETE surfaces are also noted in the table. The examples having a mixture of sulfanilic acid and NaNO2 changed in color, increased in solution pH, and had bubble formation at the surface of the PETE disks. The PETE disk products treated with a mixture of sulfanilic acid and NaNO2 were still transparent and have attached p-$C_6H_4CO_2$-groups.

Example 8

Preparation of a Polymeric Products Using Polystyrene

Polymeric products were prepared in the same manner as Example 7, except that 2-inch disks of PS were the substrates. The amounts of p-amino benzoic acid and NaNO2 were varied as listed in Table 6. The color changes and bubbling at the PS surfaces are also noted in the table. The examples having a mixture of p-amino benzoic acid and NaNO2 changed in color and had bubble formation at the surface of the PS disks. The PS disk products treated with a mixture of p-amino benzoic acid and NaNO2 were still white and have attached p-$C_6H_4CO_2$-groups.

TABLE 5

Amount of Reactants and Observations for p-Amino Benzoic Acid-PETE Products

| Example | Added p-Amino Benzoic Acid (g) | Added NaNO2 (g) | Color (initial) | Color (5 min) | Color (8 hr) | pH (initial) | pH (8 h) | Bubbling at Disk Surface |
|---|---|---|---|---|---|---|---|---|
| 6 | 4.2 | 2.3 | clear-white | yellow-white | brown-white | 4.85 | 6.12 | Yes |
| 7a | 0.42 | 0.23 | clear-white | yellow-white | brown-white | 4.72 | 5.56 | Yes |
| 7b | 0.042 | 0.023 | clear-white | yellow-white | yellow-white | 4.45 | 5.39 | Yes |

TABLE 6

Amount of Reactants and Observations for p-Amino Benzoic Acid-PS Products

| Example | Added p-Amino Benzoic Acid (g) | Added NaNO2 (g) | Color (initial) | Color (5 min) | Color (8 hr) | Bubbling at Disk Surface |
|---|---|---|---|---|---|---|
| 8a | 4.2 | 2.3 | clear-white | yellow-white | brown-white | Yes |
| 8b | 0.42 | 0.23 | clear-white | yellow-white | brown-white | Yes |
| 8c | 0.042 | 0.023 | clear-white | yellow-white | yellow-white | Yes |

Example 9

Preparation of Polymeric Products Using Polyimide

Polymeric products were prepared in the same manner as Example 7, except that a 4 sq. inch film of PI was used as the substrate. The amounts of p-amino benzoic acid and NaNO2 were varied as listed in Table 7. The color changes and bubbling at the PI surfaces are also noted in the table. The examples having a mixture of p-amino benzoic acid and NaNO2 changed in color and had bubble formation at the surface of the PI films. The PI film products treated with a mixture of p-amino benzoic acid and NaNO2 were still transparent gold and have attached p-$C_6H_4CO_2$-groups.

TABLE 7

Amount of Reactants and Observations for p-Amino Benzoic Acid-PI Products

| Example | Added p-Amino Benzoic Acid (g) | Added NaNO2 (g) | Color (initial) | Color (5 min) | Color (8 hr) | Bubbling at Disk Surface |
|---|---|---|---|---|---|---|
| 9a | 4.2 | 2.3 | clear-white | yellow-white | black-white | Yes |
| 9b | 0.42 | 0.23 | clear-white | yellow-white | brown-white | Yes |
| 9c | 0.042 | 0.023 | clear-white | yellow-white | yellow-white | Yes |

Example 10

Preparation of a Polymeric Product Using Polyethyleneterephthalate

A solution of 5.2 g of 3-amino-6-chlorobenzoic acid in 75 ml of water at about 70 deg C. and a solution of 2.3 g of NaNO2 in 75 ml of water at about 70 deg C. were poured in a 250 ml PYREX® beaker containing a 2-inch disk of PETE. Rapid bubbling occurred at the surface of the PETE disk. Within five minutes the color of the mixture changed from clear-white to tan, and after 8 hours the mixture was dark brown. The initial pH of the mixture was 5.15. The reaction was allowed to continue for eight hours, and the resulting pH was 5.56. Bubbling was still visible at the surface of the disk. The PETE disk was removed from the mixture and washed repeatedly with water. The PETE disk product was still transparent and has attached $C_6H_4ClCO_2$— groups.

Example 11

Preparation of Polymeric Products using Polyethyleneterephthalate

Polymeric products were prepared in the same manner as Example 10, except the amounts of 3-amino-6-chlorobenzoic acid and NaNO2 were varied as listed in Table 8. The color changes and pH values of the mixtures, and bubbling at the PETE surfaces are also noted in the table. The examples having a mixture of sulfanilic acid and NaNO2 changed in color, increased in solution pH, and had bubble formation at the surface of the PETE disks. The PETE disk products treated with a mixture of 3-amino-6-chlorobenzoic acid and NaNO2 were still transparent and have attached $C_6H_4ClCO_2$— groups.

TABLE 8

Amount of Reactants and Observations for 3-Amino-6-Chlorobenzoic Acid-PETE Products

| Example | Added 3-Amino-6-Chlorobenzoic Acid (g) | Added NaNO2 (g) | Color (initial) | Color (5 min) | Color (8 hr) | pH (initial) | pH (8 h) | Bubbling at Disk Surface |
|---|---|---|---|---|---|---|---|---|
| 10 | 5.2 | 2.3 | clear-white | tan | dark brown | 5.15 | 5.56 | Yes |
| 11a | 0.52 | 0.23 | clear-white | Yellow | dark brown | 4.59 | 4.85 | Yes |
| 11b | 0.052 | 0.023 | clear-white | light yellow | yellow | 3.90 | 4.35 | Yes |

Example 12

Preparation of a Polymeric Products using Polystyrene

Polymeric products were prepared in the same manner as Example 11, except that 2-inch disks of PS were the substrates. The amounts of 3-amino-6-chlorobenzoic acid and NaNO2 were varied as listed in Table 9. The color changes and bubbling at the PS surfaces are also noted in the table. The examples having a mixture of 3-amino-6-chlorobenzoic acid and NaNO2 changed in color and had bubble formation at the surface of the PS disks. The PS disk products treated with a mixture of 3-amino-6-chlorobenzoic acid and NaNO2 were still white and have attached C6H4ClCO2-groups.

Example 14

Surface Analysis of Polymeric Polyethyleneterephthalate Products

Examples 1 and 2 were rinsed with fifty ml of distilled water ten times and dried before about 0.1 ml of distilled water was dropped onto the PETE disks and the resultant contact angle measured. On another part of the treated disks about 0.1 ml of methylene iodide was dropped and the resultant contact angle measured. The surface energies were calculated using the contact angles with the Young-Dupree equation, with the results shown in Table 11.

TABLE 9

Amount of Reactants and Observations for 3-Amino-6-Chlorobenzoic Acid-PS Products

| Example | Added 3-Amino-6-Chlorobenzoic Acid (g) | Added NaNO2 (g) | Color (initial) | Color (5 min) | Color (8 hr) | Bubbling at Disk Surface |
|---|---|---|---|---|---|---|
| 12a | 5.2 | 2.3 | clear-white | tan | dark brown | Yes |
| 12b | 0.52 | 0.23 | clear-white | yellow | dark brown | Yes |
| 12c | 0.052 | 0.023 | clear-white | light yellow | yellow | Yes |

Example 13

Preparation of a Polymeric Products using Polyimide

Polymeric products were prepared in the same manner as Example 11, except that a 4 sq. inch film of PI was used as the substrates. The amounts of 3-amino-6-chlorobenzoic acid and NaNO2 were varied as listed in Table 9. The color changes and bubbling at the PS surfaces are also noted in the table. The examples having a mixture of 3-amino-6-chlorobenzoic acid and NaNO2 changed in color and had bubble formation at the surface of the PI films. The PI film products treated with a mixture of 3-amino-6-chlorobenzoic acid and NaNO2 were still transparent gold and have attached C6H4ClCO2-groups.

TABLE 11

Amount of Sulfanilic Acid Treatment and Resulting Contact Angles and Surface Energies for Polyethyleneterephthalate Products

| Example | Added Sulfanilic Acid (g) | Contact Angle-Water | Contact Angle-Methylene Iodide | Surface Energy (dyn/cm) |
|---|---|---|---|---|
| 1 | 5.2 | 47.4 | 40.8 | 55.0 |
| 2a | 0.52 | 58.9 | 24.7 | 52.8 |
| 2b | 0.052 | 72.9 | 42.6 | 42.5 |
| 2c | 0.52* | 66.6 | 43.0 | 41.8 |
| 2d | 0 | 72.9 | 42.0 | 42.0 |

TABLE 10

Amount of Reactants and Observations for 3-Amino-6-Chlorbenzoic Acid-PI Products

| Example | Added 3-Amino-6-Chlorobenzoic Acid (g) | Added NaNO2 (g) | Color (initial) | Color (5 min) | Color (8 hr) | Bubbling at Disk Surface |
|---|---|---|---|---|---|---|
| 13a | 5.2 | 2.3 | clear-white | tan | dark brown | Yes |
| 13b | 0.52 | 0.23 | clear-white | yellow | dark brown | Yes |
| 13c | 0.052 | 0.023 | clear-white | light yellow | yellow | Yes |

TABLE 11-continued

Amount of Sulfanilic Acid Treatment and Resulting Contact Angles and Surface Energies for Polyethyleneterephthalate Products

| Example | Added Sulfanilic Acid (g) | Contact Angle- Water | Contact Angle- Methylene Iodide | Surface Energy (dyn/cm) |
|---|---|---|---|---|
| 2e | 0 | 74.4 | 40.0 | 42.0 |

*Note: NANO2 was not used in preparing Example 2c.

The results show that as the amount of treatment using sulfanilic acid and NaNO2 increased, the contact angle between water and PETE decreased, and the surface became more hydrophilic. The surface energy also increased with increased treatment. The results also demonstrate that both sulfanilic acid and NaNO2 are needed for surface treatment for Polyethyleneterephthalate products. All examples were identical in color, indicating no changes in non-surface properties.

Example 15

Surface Analysis of Polymeric Polystyrene Products

Examples 3 were prepared in the same manner as Example 14, only using the PS disks. The resultant contact angles were measured and the surface energies calculated, as shown in Table 12.

TABLE 12

Amount of Sulfanilic Acid Treatment and Resulting Contact Angles and Surface Energies for Polystyrene Products

| Example | Added Sulfanilic Acid (g) | Contact Angle- Water | Contact Angle- Methylene Iodide | Surface Energy (dyn/cm) |
|---|---|---|---|---|
| 3a | 5.2 | 56.5 | 39.2 | 50.2 |
| 3b | 0.52 | 62.8 | 32.8 | 48.9 |
| 3c | 0.052 | 60.8 | 38.0 | 48.3 |
| 3f | 0 | 76.6 | 38.8 | 42.1 |

The results show that as the amount of treatment using sulfanilic acid and NaNO2 increased, the contact angle between water and PS decreased, and the surface became more hydrophilic. The surface energy also increased with increased treatment. The results also demonstrate that both sulfanilic acid and NaNO2 are needed for surface treatment for Polystyrene products. All examples were identical in color, indicating no changes in non-surface properties.

Example 16

Surface Analysis of Polymeric Polyimide Products

Examples 4 were prepared in the same manner as Example 14, only using the PI films and distilled water. The resultant contact angles were measured as shown in Table 14.

TABLE 13

Amount of Sulfanilic Acid Treatment and Resulting Contact Angles for Polyimide Products

| Example | Added Sulfanilic Acid (g) | Contact Angle- Water |
|---|---|---|
| 4a | 5.2 | 50.2 |
| 4b | 0.52 | 63.9 |
| 4c | 0.052 | 74.3 |
| 4c | 0 | 74.6 |

The results show that as the amount of treatment using sulfanilic acid and NaNO2 increased, the contact angle between water and PI decreased, and the surface became more hydrophilic. The results also demonstrate that both sulfanilic acid and NaNO2 are needed for surface treatment for Polyimide products. All examples were identical in color, indicating no changes in non-surface properties.

Example 17

Surface Analysis of Polymeric Polycarbonate Products

Examples 5 were prepared in the same manner as Example 14, only using the PC films. The resultant contact angles were measured and the surface energies calculated, as shown in Table 14.

TABLE 14

Amount of Sulfanilic Acid Treatment and Resulting Contact Angles and Surface Energies for Polycarbonate Products.

| Example | Added Sulfanilic Acid (g) | Contact Angle- Water | Contact Angle- Methylene Iodide | Surface Energy (dyn/cm) |
|---|---|---|---|---|
| 5a | 5.2 | 63.3 | 60.8 | 40.6 |
| 5b | 0 | 49.5 | 38.4 | 54.3 |

The results show that treatment using sulfanilic acid and NaNO2 decreased the contact angle between water and PC, and the surface became more hydrophilic. The surface energy also increased with increased treatment. The results also demonstrate that both sulfanilic acid and NaNO2 are needed for surface treatment for Polycarbonate products. All examples were identical in color, indicating no changes in non-surface properties.

Example 18

Examples 6 and 7 were prepared in the same manner as Example 14. The resultant contact angles were measured and the surface energies calculated, as shown in Table 15. Example 2e results are included as a reference for an untreated PETE disk.

TABLE 15

Amount of p-Amino Benzoic Acid Treatment and Resulting Contact Angles and Surface Energies for Polyethyleneterephthalate Products

| Example | Added p-Amino Benzoic Acid (g) | Contact Angle-Water | Contact Angle-Methylene Iodide | Surface Energy (dyn/cm) |
|---|---|---|---|---|
| 6 | 4.2 | 45.9 | 33.6 | 57.4 |
| 7a | 0.42 | 56.5 | 24.3 | 52.6 |
| 7b | 0.042 | 62.8 | 35.0 | 47.3 |
| 2e | 0 | 74.4 | 40.0 | 42.0 |

The results show that as the amount of treatment using p-amino benzoic acid and NaNO2 increased, the contact angle between water and PETE decreased, and the surface became more hydrophilic. The surface energy also increased with increased treatment. The results also demonstrate that both p-amino benzoic acid and NaNO2 are needed for surface treatment for Polyethyleneterephthalate products. All examples were identical in color, indicating no changes in non-surface properties.

Example 19

Surface Analysis of Polymeric Polystyrene Products

Example 8 was prepared in the same manner as Example 14. The resultant contact angles were measured and the surface energies calculated, as shown in Table 16. Example 3f results are included as a reference for an untreated PS disk.

TABLE 16

Amount of p-Amino Benzoic Acid Treatment and Resulting Contact Angles and Surface Energies for Polystyrene Products

| Example | Added p-Amino Benzoic Acid (g) | Contact Angle-Water | Contact Angle-Methylene Iodide | Surface Energy (dyn/cm) |
|---|---|---|---|---|
| 8a | 4.2 | 25.4 | 18.6 | 69.9 |
| 8b | 0.42 | 35.6 | 27.5 | 64.0 |
| 8c | 0.042 | 38.3 | 32.0 | 61.8 |
| 3f | 0 | 76.6 | 38.8 | 42.1 |

The results show that as the amount of treatment using p-aminobenzoic acid and NaNO2 increased, the contact angle between water and PETE decreased, and the surface became more hydrophilic. The surface energy also increased with increased treatment. The results also demonstrate that both p-amino benzoic acid and NaNO2 are needed for surface treatment for Polyethyleneterephthalate products. All examples were identical in color, indicating no changes in non-surface properties.

Example 20

Surface Analysis of Polymeric Polyimide Products

Example 9 was prepared in the same manner as Example 14. The resultant contact angles were measured using distilled water and compared to Example 3f results, the reference for an untreated PI film.

TABLE 17

Amount of p-Amino Benzoic Acid Treatment and Resulting Contact Angles and Surface Energies for Polyimide Products

| Example | Added Sulfanilic Acid (g) | Contact Angle-Water |
|---|---|---|
| 9a | 4.2 | 48.2 |
| 9b | 0.42 | 63.9 |
| 9c | 0.042 | 66.1 |
| 4c | 0 | 74.6 |

The results show that as the amount of treatment using p-aminobenzoic acid and NaNO2 increased, the contact angle between water and PI decreased, and the surface became more hydrophilic. The results also demonstrate that both p-amino benzoic acid and NaNO2 are needed for surface treatment for Polyimide products. All examples were identical in color, indicating no changes in non-surface properties.

Example 21

Surface Analysis of Polymeric Polyethyleneterephthalate Products

Examples 10 and 11 were prepared in the same manner as Example 14. The resultant contact angles were measured and the surface energies calculated, as shown in Table 18. Example 2e results are included as a reference for an untreated PETE disk.

TABLE 18

Amount of 3-Amino-6-chlorobenzoic acid Treatment and Resulting Contact Angles and Surface Energies for Products

| Example | Added 3-Amino-6-Chlorobenzoic Acid (g) | Contact Angle-Water | Contact Angle-Methylene Iodide | Surface Energy (dyn/cm) |
|---|---|---|---|---|
| 10 | 5.2 | 4.2 | 30.0 | 59.0 |
| 11a | 0.52 | 56.5 | 31.4 | 52.2 |
| 11b | 0.052 | 62.8 | 25.8 | 50.9 |
| 2e | 0 | 74.4 | 40.0 | 42.0 |

The results show that as the amount of treatment using 3-amino-6-chlorobenzoic acid and NaNO2 increased, the contact angle between water and PETE decreased, and the surface became more hydrophilic. The surface energy also increased with increased treatment. The results also demonstrate that both 3-amino-6-chlorobenzoic acid and NaNO2 are needed for surface treatment for Polyethyleneterephthalate products. All examples were identical in color, indicating no changes in non-surface properties.

Example 22

Surface Analysis of Polymeric Polystyrene Products

Example 12 was prepared in the same manner as Example 14. The resultant contact angles were measured and the surface energies calculated, as shown in Table 19. Example 3f results are included as a reference for an untreated PS disk.

TABLE 19

Amount of 3-Amino-6-chlorobenzoic acid Treatment and Resulting Contact Angles and Surface Energies for Polystryene Products

| Example | Added 3-Amino-6-Chlorobenzoic Acid (g) | Contact Angle-Water | Contact Angle-Methylene Iodide | Surface Energy (dyn/cm) |
|---|---|---|---|---|
| 12a | 5.2 | 46.9 | 24.1 | 58.7 |
| 12b | 0.52 | 48.1 | 27.2 | 57.5 |
| 12c | 0.052 | 48.8 | 27.3 | 57.4 |
| 3f | 0 | 76.6 | 38.8 | 42.1 |

The results show that as the amount of treatment using 3-amino-6-chlorobenzoic acid and NaNO2 increased, the contact angle between water and PS decreased, and the surface became more hydrophilic. The surface energy also increased with increased treatment. The results also demonstrate that both 3-amino-6-chlorobenzoic acid and NaNO2 are needed for surface treatment for Polystyrene products. All examples were identical in color, indicating no changes in non-surface properties.

Example 23

Surface Analysis of Polymeric Polyimide Products

Example 13 was prepared in the same manner as Example 14. The resultant contact angles were measured using distilled water and compared to Example 3f results, the reference for an untreated PI film.

TABLE 20

Amount of 3-Amino-6-chlorobenzoic acid Treatment and Resulting Contact Angles and Surface Energies for Polyimide Products

| Example | Added 3-Amino-6-Chlorobenzoic Acid (g) | Contact Angle-Water |
|---|---|---|
| 13a | 5.2 | 52.5 |
| 13b | 0.52 | 63.8 |
| 13c | 0.052 | 69.1 |
| 4c | 0 | 74.6 |

The results show that as the amount of treatment using 3-amino-6-chlorobenzoic acid and NaNO2 increased, the contact angle between water and PI decreased, and the surface became more hydrophilic. The results also demonstrate that both amino benzoic acid and NaNO2 are needed for surface treatment for Polyimide products. All examples were identical in color, indicating no changes in non-surface properties.

Example 24

Preparation of Polymeric Products using Polycarbonate

Polymeric products were prepared in the same manner as Example 1, except that a polycarbonate membrane filter was the substrate. The color of the treating mixture changed from clear-white to dark brown within five minutes, with visible bubbling at the surface of the PC membrane. After eight hours of treatment the mixture remained dark brown with bubbling at the surface of the membrane. The PC membrane filter products treated with a mixture of sulfanilic acid and NaNO2 have attached p-C6H4SO3-groups. All membranes were identical in color, indicating no changes in non-surface properties.

Example 25

Preparation of Polymeric Products using Polycarbonate Membrane Filters

Polymeric products were prepared in the same manner as Example 2a, except that a polycarbonate membrane filter was the substrate. The color of the treating mixture changed from clear-white to dark brown within five minutes, with visible bubbling at the surface of the PC membrane. After eight hours of treatment the mixture remained dark brown with bubbling at the surface of the membrane. The PC membrane filter products treated with a mixture of sulfanilic acid and NaNO2 have attached p-C6H4SO3-groups. All membranes were identical in color, indicating no changes in non-surface properties.

Example 26

Preparation of Polymeric Products using Polycarbonate Membrane Filters

Polymeric products were prepared in the same manner as Example 6, except that a polycarbonate membrane filter was the substrate. The color of the treating mixture changed from clear-white to yellow-white within five minutes, with visible bubbling at the surface of the PC membrane. After eight hours of treatment the mixture was dark brown with bubbling at the surface of the membrane. The PC membrane filter products treated with a mixture of p-amino benzoic acid and NaNO2 have attached p-C6H4CO2-groups. All membranes were identical in color, indicating no changes in non-surface properties.

Example 27

Preparation of Polymeric Products using Polycarbonate Membrane Filters

Polymeric products were prepared in the same manner as Example 10, except that a polycarbonate membrane filter was the substrate. The color of the treating mixture changed from clear-white to tan within five minutes, with visible bubbling at the surface of the PC membrane. After eight hours of treatment the mixture was dark brown with bubbling at the surface of the membrane. The PC membrane filter products treated with a mixture of 3-amino-6-chlorobenzoic acid and NaNO2 have attached C6H4ClCO2-groups. All membranes were identical in color, indicating no changes in non-surface properties.

Example 28

Preparation of Polymeric Products using Polycarbonate Membrane Filters

The PC membrane filters from Examples 24–27, and untreated filters (Example 28a), were washed repeatedly with distilled water before being placed in filter cartridge holders. The holders were attached to 10 ml and 60 ml syringes, containing 10 ml and 50 ml, respectively, of distilled water. The syringe plunger was depressed and the time to expel all water from of the syringes was measured. Table 21 shows the average expulsion times of three runs per filter, along with the pressure rating for the membrane filters.

TABLE 21

Expulsion Time and Pressure Rating for Distilled Water
Through 1.2 μm Polycarbonate Membrane Filter Products

| | 10 ml | | 50 ml | |
|---|---|---|---|---|
| Example | Expulsion Time (sec) | Pressure Rating* | Expulsion Time (sec) | Pressure Rating |
| 24 | 3.2 | 1 | 24 | 1 |
| 25 | 6.1 | 1 | 38 | 2 |
| 26 | 10.2 | 2 | 92 | 4 |
| 27 | 4.3 | 1 | 27 | 1 |
| 28a | 1634 | 3 | 108 | 5 |

Pressue Rating:
1 = Little Pressure, Continuous Stream of Ejected Water
3 = Medium Pressure, Easy Droplet Formation
5 = High Pressure, Slow Droplet Formation The results show that treatment using sulfanilic acid, p-amino benzoic acid, and 3-amino-6-chlorobenzoic acid causes the surface of the PC membrane filters to become more hydrophilic, resulting in better wetting, decreased expulsion time and decreased expulsion pressure. The results also demonstrate that the amount and type of surface treatment influence the flow rate of liquids through porous filters, and may be used to selectively remove or entrap material based on composition and charge in addition to size.

Example 29

Chemical Analyses of Polymeric Products

Surface treated and untreated polymeric products were analyzed for sulfur and chlorine by ICP and IC analysis with the results shown in Table 22.

TABLE 22

Chemical Analyses of Polymeric Products Treated With Sulfanilic
Acid, 3-Amino-6-Chlorobenzoic Acid And Untreated Products

| Example | Added Sulfanilic Acid (g) | Added 3-Amino-6-Chlorobenzoic Acid | Sulfur (ppm) | Chlorine (ppm) |
|---|---|---|---|---|
| 2e | 0 | 0 | <15 ppm* | 24 |
| 1 | 5.2 | 0 | 224 | — |
| 10 | —** | 5.2 | — | 198 |

*limitation of analysis method
**—not measured

The results show that treatment using sulfanilic acid with an aromatic polymer, PETE, caused the polymer of Example 1 to become modified and have a substantial increase in the amount of sulfur compared to that of the untreated polymer of Example 2e. The results also show that treatment using 3-amino-6-chlorobenzoic acid with an aromatic polymer, PETE, caused the polymer of Example 10 to become modified and have a substantial increase in the amount of chlorine compared to that of the untreated polymer of Example 2e. In all cases, chemical analysis shows substantial increases of reacted-chemical elements and indicates that that the nonporous, aromatic polymers had their surfaces modified with attached chemical groups.

Example 30

Preparation of Polymeric Products using Polyethyleneterephthalate

Polymeric products were prepared in the same manner as Example 1, except that the temperature of the solutions of sulfanilic acid in water and the NaNO2 in water varied to be both 20 degrees C. or 90 degrees C. The color changes of the mixtures and bubbling at the PETE surfaces are noted in Table 23.

TABLE 23

Effect of Solution Temperature for
Sulfanilic acid-PETE Products

| Example | Temperature deg C. | Color (initial) | Color (5 min) | Color (8 hr) | Bubbling At Disk Surface |
|---|---|---|---|---|---|
| 1 | 70 | clear-white | dark brown | dark brown | Yes |
| 30a | 20 | clear-white | clear-white | tan | Yes |
| 30b | 90 | clear-white | dark brown | dark brown | Yes |

The results show that treatment using sulfanilic acid with an aromatic polymer, PETE, at differing temperatures influences the attachment of the sulfanilic acid as indicated by the color of the reactants. The results also show that the surface treatment occurred over a wide range of reactant temperatures, due to the color changes and the bubbling at the substrate surfaces. The PETE disk products treated under different temperature conditions with a mixture of sulfanilic acid and NaNO2 were still transparent and have attached p-C6H4SO3-groups.

What is claimed is:

1. A process for modifying the surface of a polymeric substrate, said process comprising:
   providing a polymeric substrate containing aliphatic carbon-hydrogen bonds;
   forming a protic composition comprising a diazonium salt formed by diazotizing an amino compound comprising at least one amino group bonded to an aromatic group; and
   contacting a surface of said polymeric substrate with said protic composition under conditions effective to allow reaction of said composition with said surface, resulting in attachment of said aromatic group to said surface.

2. The process of claim 1 wherein said polymeric substrate comprises aliphatic carbon atoms, at least 50 percent of said atoms having at least one carbon-hydrogen bond.

3. The process of claim 1 wherein said polymeric substrate comprises a homopolymer or a copolymer formed from monomers selected from the group consisting of alkenes, cycloalkenes, arylalkenes, and mixtures thereof.

4. The process of claim 1 wherein said polymeric substrate comprises a condensation polymer or a vinyl polymer.

5. The process of claim 1 wherein said polymeric substrate comprises a natural polymer or a synthetic polymer.

6. The process of claim 1 wherein said polymeric substrate includes moieties selected from the group consisting of unsaturated linkages, hydroxyl, amino, carbonamido, sulfonamido, ether, keto, ester, sulfone, carboxy, sulfo, cyano, halo, and combinations thereof.

7. The process of claim 1 wherein said polymeric substrate is in the form of a sheet.

8. The process of claim 1 wherein said aromatic group of said amino compound comprises an aryl group or a heteroaryl group.

9. The process of claim 1 wherein said amino compound has the formula

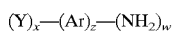

wherein Y represents H or one or more substituents, Ar is an aromatic group, and $NH_2$ is a primary amine, and with x being an integer of 1 or greater, z being an integer of 1 or greater, and w being an integer of 1 or greater.

10. The process of claim 9 wherein Ar represents a phenyl, naphthyl, anthryl, phenanthryl, biphenyl, pyridyl, benzothiazolyl, or benzothiazolyl group.

11. The process of claim 9 wherein Y represents a hydrophobic substituent.

12. The process of claim 9 wherein Y represents a hydrophilic substituent.

13. The process of claim 12 wherein said hydrophilic substituent is an acidic substituent or a salt thereof.

14. The process of claim 9 wherein Y represents an ionizable or an ionic substituent.

15. The process of claim 9 wherein Y is selected from the group consisting of hydroxyl, amino, carbonamido, carbamyl, sulfonamido, sulfamyl, ether, keto, sulfone, carboxy, sulfo, phosphono, cyano, halo, alkyl, cycloalkyl, aryl, heteroaryl, and combinations thereof.

16. The process of claim 1 wherein said amino compound is a polymeric compound.

17. The process of claim 10 wherein said amino compound is selected from the group consisting of 4-aminobenzoic acid, 4-aminosalicylic acid, aminophenylboronic acid, aminophenyiphosphonic acid, 4-aminophthalic acid, metanilic acid, 3-amino-6-chlorobenzoic acid, and salts thereof.

18. The process of claim 1 wherein said protic composition comprises an aqueous solution of said diazonium salt.

19. The process of claim 18 wherein said aqueous solution has a pH of about 1 to about 6.

20. The process of claim 18 wherein said aqueous solution further includes an organic solvent.

21. The process of claim 20 wherein said organic solvent comprises alcohol.

22. The process of claim 1 wherein said diazonium salt is formed in the presence of said polymeric substrate.

23. The process of claim 1 wherein said contacting is carried out at a temperature of about −10° C. to about 100° C.

24. The process of claim 23 wherein said contacting is carried out a temperature of about 40° C. to about 90° C.

25. The process of claim 24 wherein said contacting is carried out a temperature of about 70° C.

26. A surface modified polymeric substrate formed by the process of claim 1.

* * * * *